United States Patent [19]

Cartner

[11] Patent Number: 5,046,311
[45] Date of Patent: Sep. 10, 1991

[54] HYDRAULIC CONTROL SYSTEM

[76] Inventor: Jack O. Cartner, 1005 N. 8th St., Cambridge, Ohio 43725

[21] Appl. No.: 450,414

[22] Filed: Dec. 14, 1989

[51] Int. Cl.⁵ .............................................. F16D 31/02
[52] U.S. Cl. ........................................ 60/468; 60/427; 60/484; 60/486; 60/494
[58] Field of Search ................. 60/484, 486, 494, 427, 60/468; 37/DIG. 9, DIG. 10, DIG. 11; 56/10.8, 10.9, 11.9

[56] References Cited

U.S. PATENT DOCUMENTS

| | | | |
|---|---|---|---|
| 3,872,670 | 3/1975 | Dezelan et al. | 60/484 X |
| 3,922,855 | 12/1975 | Bridwell et al. | 60/484 X |
| 3,949,539 | 4/1976 | Cartner | 56/10.4 |
| 4,023,364 | 5/1977 | Bianchetta | 60/486 X |
| 4,040,439 | 8/1977 | Uppal | 60/468 X |
| 4,495,754 | 1/1985 | Cartner | 56/11.9 |
| 4,506,464 | 3/1985 | Cartner | 37/91 |
| 4,561,341 | 12/1985 | Alkawa | 60/484 X |
| 4,852,660 | 8/1989 | Leidinger et al. | 60/494 X |
| 4,938,023 | 7/1990 | Yoshino | 60/427 |

Primary Examiner—Edward K. Look
Assistant Examiner—Todd Mattingly
Attorney, Agent, or Firm—Fay, Sharpe, Beall, Fagan, Minnich & McKee

[57] ABSTRACT

A hydraulic control system includes a pump, a hydraulic cylinder and a cylinder hydraulic circuit interconnecting the pump and the cylinder. The circuit includes a first hydraulic fluid line extending between the pump and the cylinder and a control valve located in the fluid line for controlling the communication of fluid between the pump and the cylinder. A second hydraulic fluid line is in fluid communication with the first line downstream from the control valve. A first relief valve is located in the second fluid line and a first shut off valve is also located in the second fluid line and interposed between the first relief valve and the first fluid line. The shut off valve is solenoid actuated to a closed position. A motor hydraulic circuit includes a third hydraulic fluid line and a solenoid actuated motor control valve for controlling the flow of fluid through the third fluid line. An interconnect system is provided for operating the first shut off valve and the motor control valve in unison.

20 Claims, 6 Drawing Sheets

HYDRAULIC CONTROL SYSTEM

BACKGROUND OF THE INVENTION

This invention pertains to a hydraulic control system. More particularly, the present invention relates to a hydraulic control system which interconnects a motor control circuit of a hydraulic motor powering a device secured to an arm mounted on a vehicle with the arm's breakaway circuit.

The invention finds particular application in road maintenance equipment used for cleaning and maintaining the shoulders of roads or berms and will be described with reference thereto. However, it should be appreciated that the invention also finds application in other hydraulically powered equipment which is provided with a breakaway circuit.

Heretofore, various cutting tools have been mounted on tractors or other prime movers by a variety of arm assemblies. The arm assemblies hold the cutting apparatus to the side of the tractor for cutting away vegetation or earth as may be required for road maintenance. Such equipment is used for mowing, digging, trenching and the like. Hydraulic cylinders are provided to control the forward and aft angular orientation of the arm and the cutter relative to the tractor. One or more height and distance hydraulic cylinders are also provided to raise and lower the cutting apparatus as well as to move it toward and away from the tractor. From time to time, stumps, fence posts, large rocks and the like are obscured from the driver's view by vegetation or other barriers. As is to be appreciated, impacting a relatively immovable object with the cutting tool is likely to damage either the cutting tool, the arm or the tractor. Therefore, several solutions have been proposed to solve this problem. These solutions are various types of breakaway circuits which allow the arm, and hence the cutting tool, to swing fore and aft upon impact with a relatively immovable object.

However, when a cutting head is removed from the arm assembly and replaced by a scraping bucket or the like, it would be advantageous to disable the breakaway system. Such a bucket would be connected to the arm assembly when it is desired to scoop up dirt and place the dirt in a dump truck such as when road maintenance is required. When a bucket is secured to the arm assembly, it would be disadvantageous to trip a breakaway circuit while scooping up dirt with the bucket since then the arm with the bucket attached would be allowed to swing back toward the tractor possibly causing injury to personnel or damage to the tractor or the arm.

Accordingly, it has been considered desirable to develop a new and improved hydraulic system which would overcome the foregoing difficulties and others while providing better and more advantageous overall results.

BRIEF SUMMARY OF THE INVENTION

In accordance with the present invention, a new and improved hydraulic control system is provided.

More particularly in accordance with this aspect of the invention, the system comprises a pump, a hydraulic cylinder and a cylinder hydraulic circuit interconnecting the pump and the cylinder. The circuit comprises a first hydraulic fluid line extending between the pump and the cylinder, a control valve located in the fluid line for controlling the communication of fluid between the pump and the cylinder and a second hydraulic fluid line in fluid communication with the first fluid line downstream from the control valve. A first relief valve is located in the second fluid line and a first shut off valve is also located in the second fluid line and interposed between the first relief valve and the first fluid line. The shut off valve is solenoid actuated to a closed position. A motor hydraulic circuit is also provided and comprises a third hydraulic fluid line and a solenoid actuated motor control valve for controlling the flow of fluid through the third hydraulic fluid line. An interconnect means operates the first shut off valve and the motor control valve in unison.

In accordance with another aspect of the invention, a hydraulic control system is provided.

More particularly in accordance with this aspect of the invention, the system comprises a pump, a hydraulic cylinder and a cylinder hydraulic circuit for interconnecting the pump and the cylinder. The circuit comprises a first hydraulic fluid line extending between the pump and the cylinder and a control valve located in the fluid line for controlling the communication of fluid between the pump and the cylinder. A second hydraulic fluid line interconnects the control valve and the cylinder. A third hydraulic fluid line interconnects the first and second fluid lines. A check valve is located in the third fluid line and a first shut off valve is also located in the third fluid line. The shut off valve is solenoid actuated to a closed position. A motor hydraulic circuit is also provided and comprises a fourth hydraulic fluid line and a solenoid actuated motor control valve for controlling the flow of fluid through the fourth fluid line. An interconnect means is provided for operating the first shut off valve and the motor control valve in unison.

According to still another aspect of the invention, a hydraulic control system is provided.

More particularly in accordance with this aspect of the invention, the system comprises a pump, a hydraulic cylinder and a cylinder hydraulic circuit interconnecting the pump and the cylinder. The circuit comprises a first hydraulic fluid line extending between the pump and the cylinder, a control valve located in the first fluid line for controlling a flow of fluid between the pump and the cylinder and a second hydraulic fluid line extending between the control valve and the cylinder. A first valve controls a flow of fluid out of one of the first and second fluid flow lines and a first shut off valve controls a flow of fluid through the first valve. The shut off valve is solenoid actuated to a closed position. A motor hydraulic circuit is provided as well. This circuit comprises a third hydraulic fluid line and a solenoid actuated motor control valve for controlling a flow of fluid through the third hydraulic fluid line. An interconnect circuit interconnects the first shut off valve and the motor control valve so that they are both operated to a closed position in unison.

One advantage of the present invention is the provision of a new and improved hydraulic control system for interconnecting a hydraulic motor control circuit with a hydraulic breakaway circuit.

Another advantage of the present invention is the provision of a hydraulic control system in which a breakaway circuit, such as is used on an articulated arm mounted on a road maintenance vehicle, is selectively disengaged.

Still another advantage of the present invention is the provision of a hydraulic control system having solenoid controlled valves which are wired together so that they can be simultaneously actuated.

Yet another advantage of the present invention is the provision of a means for disengaging various types of breakaway systems.

A further advantage of the present invention is the provision of a road maintenance apparatus in which one or more breakaway systems provided on various hydraulic cylinders can be selectively disengaged when, for example, a mowing apparatus is replaced on a boom arm by an earth scraping bucket or the like.

An additional advantage of the present invention is the provision of a road maintenance apparatus with a hydraulic control system that is relatively simple and easy to maintain and manufacture.

Still further advantages of the present invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein.

DETAILED DESCRIPTION OF THE PREFERRED AND ALTERNATE EMBODIMENTS

Figure 1:
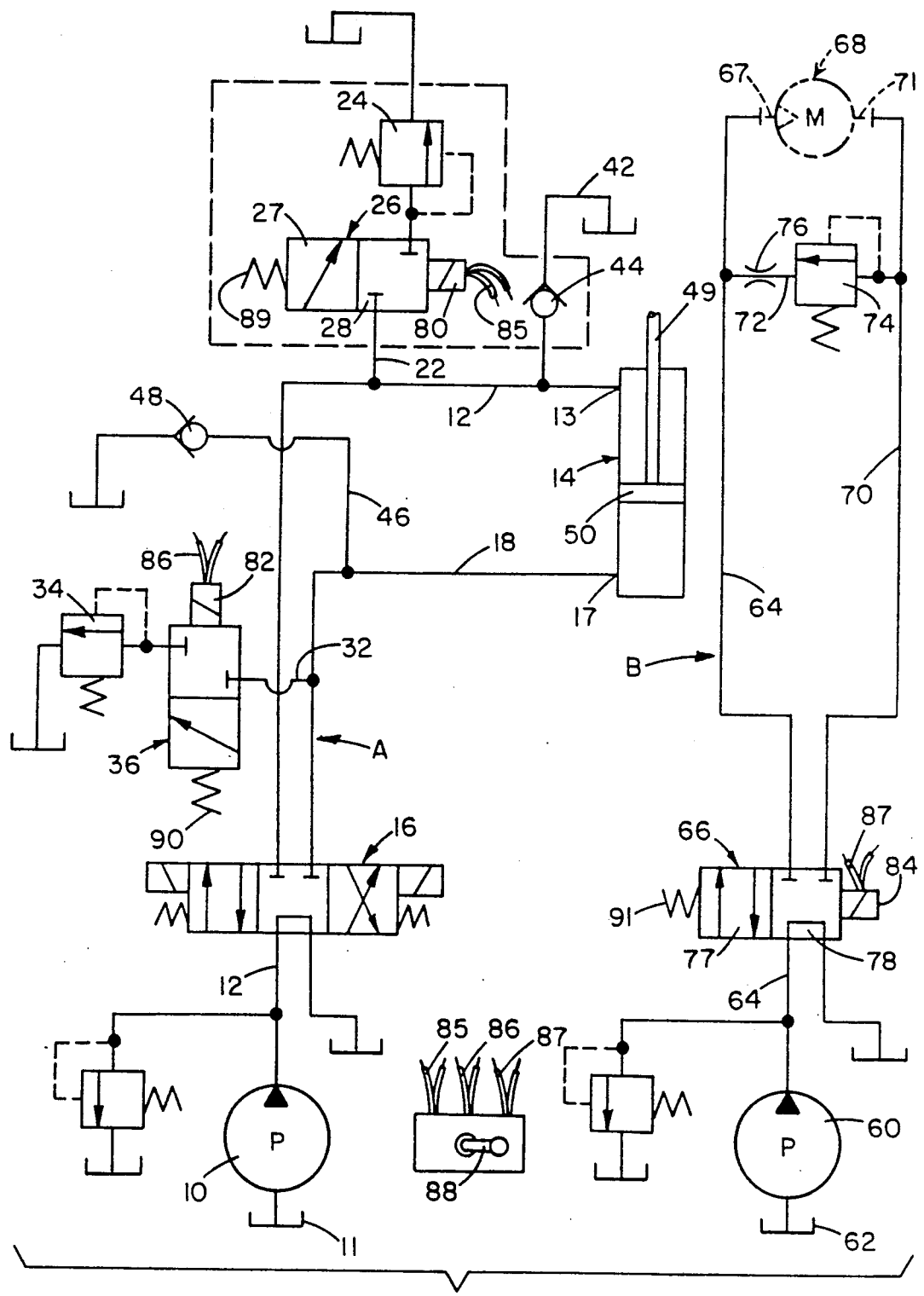
FIG. 1 is a hydraulic circuit diagram of a first type of hydraulic breakaway circuit together with a motor control circuit and a switch for operating selected control valves of both circuits simultaneously according to a first preferred embodiment of the present invention.

Referring now to the drawings, wherein the showings are for purposes of illustrating preferred and alternate embodiments of the invention only and not for purposes of limiting same, FIG. 1 shows a first type of breakaway circuit A utilized on a boom arm of a conventional road construction vehicle (not illustrated) which also has a motor control circuit B for controlling the operation of a hydraulic motor of a device located on the boom arm. While the control circuit will be described in connection with a breakaway system utilized on boom arm to which is mounted a mower head, it should be appreciated that the control system disclosed herein could also be adapted for use in many other environments.

FIG. 1 illustrates a breakaway circuit A which comprises a pump 10 that draws hydraulic fluid from a sump 11 and pumps it through a first hydraulic fluid line 12 toward a first end 13 of a hydraulic cylinder 14. A control valve 16 is interposed in the first fluid line 12 between the pump 10 and the cylinder 14. Preferably the valve 16 is a four position three way valve which is spring biased to a center, closed, position and solenoid actuated to either end position. Of course, it should be appreciated that any other conventional type of valve could also be utilized instead of the valve illustrated. Extending between another end 17 of the cylinder 14 and the valve 16 is a second fluid line 18 which connects a second end of the cylinder with the valve.

In fluid contact with the first fluid line 12 is a third fluid line 22 in which is located a relief valve 24. The relief valve allows excess hydraulic fluid to flow out of the fluid line 12 through the line 22 to a sump which may be the same sump as the sump 11 from which the pump draws fluid. Interposed between the relief valve 24 and the fluid line 12 is a first shut off valve 26 which controls the flow of hydraulic fluid through the line 22. The valve can be a two envelope two way valve having a first envelope 27 which allows a flow of fluid through the valve and a second envelope 28 which prohibits such flow.

In fluid contact with the second fluid line 18 is a fourth fluid line 32 which similarly has located therein a second relief valve 34 which selectively allows excess hydraulic fluid to flow to a sump. Interposed between the relief valve 34 and the second fluid line 18 is a second shut off valve 36 that controls the flow of hydraulic fluid through the line 32. The second valve 36 can also be a two envelope two way valve.

Also in fluid contact with the first line 12 is a fifth fluid line 42 which leads from a sump. Located in the fifth fluid line is a first check valve 44 which allows the flow of fluid from the sump to the line 12 but not vice versa. Similarly, in fluid contact with the second fluid line 18 is a sixth fluid line 46 which leads from a sump. Located in the sixth fluid line is a second check valve 48 which allows the flow of fluid from the sump to the line 18.

The cylinder 14 illustrated in FIG. 1 is a double acting cylinder with a single end rod 49 connected to a piston 50. Assuming that such a cylinder is locked in the position illustrated and further assuming that the arm assembly, and/or whatever maintenance apparatus is secured to the end of the arm assembly, strikes a stationary object from such a direction that the piston 50 of the cylinder 14 will be forced upwardly, then pressurized hydraulic fluid will flow out of the cylinder into the third fluid line 22 and through the relief valve 24, if permitted by the first control valve 26, and thence into the sump 11. Since the piston 50 is moving, however, additional hydraulic fluid will then be needed below the piston. This fluid is provided by hydraulic fluid flowing from the sump through the check valve 48 and the sixth fluid line 46 into the second fluid line 18 and hence into the cylinder 14. It should be noted that a bottom section of the cylinder 14 contains somewhat more fluid than a top section since the piston rod 49 extends only upwardly in the cylinder. Therefore more fluid will be required below the piston 50 than is exhausted above the piston through a movement of the piston.

A force exerted on either the arm or the road maintenance apparatus in the opposite direction, such that the piston 50 will be forced downwardly, causes pressurized hydraulic fluid to flow out of the cylinder 14 into line 18, the line 32 and hence, if permitted by the second control valve 36, through relief valve 34 to sump. In order to replace hydraulic fluid above the piston, fluid will flow from sump into line 42 through the check valve 44 and thence to the first fluid line 12 and into the cylinder 14. In this situation, more hydraulic fluid will flow out through line 18 than is required in through line 12 because the lower face of the piston 50 does not have a piston rod 49 secured thereto as does the upper face.

While the breakaway circuit is operative, a hydraulically powered device, such as a mower or ditcher, is being operated at the end of the boom arm. In this connection, and with further reference to FIG. 1, coupled to the hydraulic breakaway circuit A is a motor control circuit B of a hydraulic motor which actuates the device. This circuit comprises a pump 60 which draws hydraulic fluid from a sump 62 and sends pressurized hydraulic fluid through an eighth fluid line 64 and through a control valve 66 to an inlet 67 of a motor 68. A ninth fluid line 70 connects an outlet end 71 of the motor 68 with the control valve 66. Connecting the eighth and ninth fluid lines 64, 70, if desired, is a tenth fluid line 72, in which is positioned a fourth relief valve 74 as well as a restricted flow orifice 76.

Preferably, the motor control valve 66 is a two position four way valve having a first envelope 77 which allows fluid to flow from the pump 60 to the motor 68 and a second envelope 78 which blocks such flow. However, it should be appreciated that any other type of conventional valve could also be provided at this location.

When the motor control valve 66 is in the open position and fluid is flowing to the motor 68, the breakaway circuit A needs to be operative, regardless of which position the valve 16 is in.

If, however, the motor 68 is stopped or is removed entirely, such as when the device which it powers is replaced on the boom arm, then the breakaway circuit A may have to be disabled. As illustrated in FIG. 1, the motor 68 has already been removed and the two hydraulic fluid lines 64 and 70 have been clamped off adjacent their connection with the motor. That is the reason why the motor has been illustrated in dashed lines.

For example, when a mower assembly is replaced by a scraper bucket, then it would be advantageous to disable the hydraulic breakaway circuit A to allow the safe operation of the scraper bucket. In other words, it would be dangerous to have the breakaway circuit functioning when the scraper bucket is attempting to pick up dirt and move it from one 15 location to another. If the breakaway system were to be functional and be actuated in such a situation, damage could be caused by the movement of the boom arm and the bucket attached thereto either to personnel or to the material handling equipment.

Accordingly, the present invention provides solenoid actuators interconnecting the motor control valve 66 and the first and second shut off valves 26 and 36. More specifically, a first solenoid 80 is provided on the first shut off valve 26, a second solenoid 82 is provided on the second shut off valve 36, and a third solenoid 84 is provided on the motor control valve 66. Suitable wiring 85, 86 and 87 interconnects the three solenoid valves so that they can all be commonly operated by a suitable switch 88. In this way, once the switch is thrown, all three solenoid operated valves will be actuated into a closed position as shown in FIG. 1 thereby disabling the breakaway circuit by preventing the flow of hydraulic fluid through either relief valve 24 and 34. This ensures that the piston 50 in the cylinder 14 does not move despite any pressure or impact that may be exerted on the boom arm.

Preferably, each of the three solenoid operated valves 26, 36, and 66 is spring biased, by a suitable spring 89, 90, 91 to the open position and closed by its respective solenoid 80, 82, 84 to the closed position. Of course, it should be recognized that the respective valves 26, 36, 66 could also be actuated to the open position by a respective second solenoid, if desired.

The cylinder 14 can be the swing cylinder of a boom arm, i.e., the cylinder which actuates the arm assembly to move from a stowed position parallel to a longitudinal axis of a tractor or other vehicle to which the boom arm is secured, to an operative position which is approximately normal to the longitudinal axis of the tractor. Alternatively, the cylinder can be a crowd and retract cylinder on the boom arm or any other hydraulic cylinder which controls the retraction and extension of the boom arm.

Figure 1A:
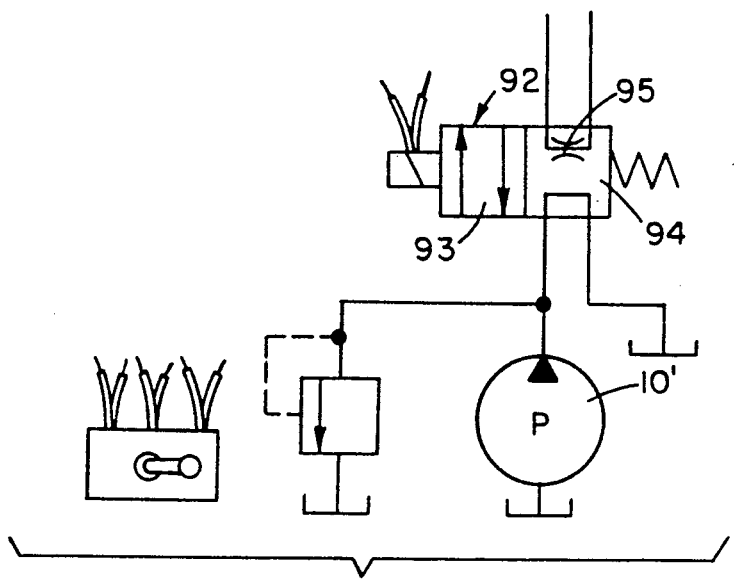
FIG. 1A is an alternate embodiment of a motor control circuit portion of FIG. 1.

FIG. 1A illustrates an alternate embodiment of the motor control circuit of FIG. 1. For ease of illustration and appreciation of this alternative, like components will be identified by like numerals with a primed suffix (') and new components will be identified by new numerals.

It can be seen that in this embodiment, a motor control valve 92 is provided with a first chamber 93 that allows fluid flow therethrough in the same way as chamber 77 of the first embodiment and a second chamber 94 which allows fluid to flow from a pump 10' to a sump through the chamber. However, in this embodiment there is no need for a third line, relief valve and restricted flow orifice as shown by components 72, 74, 76 in the first embodiment. That is because a restricted flow orifice 95 is provided in the second chamber 94 while allowing fluid to flow from a second fluid line 70' to a first fluid line 64' through the valve. As with the embodiment of FIG. 1, the valve can be solenoid actuated such as by a solenoid 84' which can be controlled by a suitable switch 88' through wiring 87'.

Figure 1B:
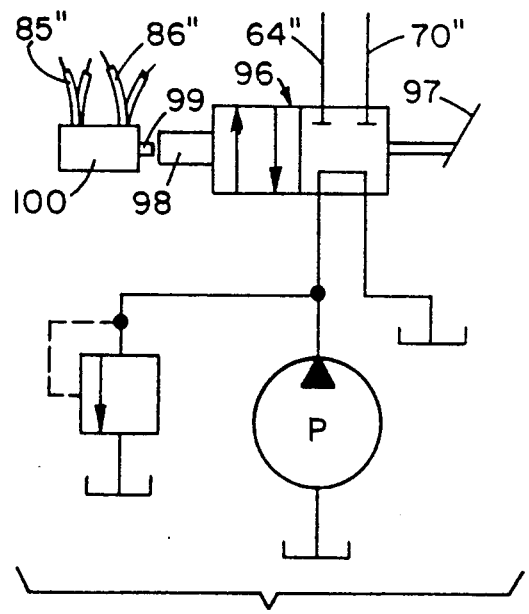
FIG. 1B is a motor control circuit and valve control box according to a second alternate embodiment of the present invention.

With reference now to FIG. 1B, a second alternate embodiment of the motor control valve is there illustrated. For ease of understanding and appreciation of this alternative, like components will be identified by like numerals with a double primed (") and new components will be identified by new numerals.

In this embodiment, a motor control valve 96 is manually actuated by a lever 97 to move the valve between a pair of chambers so as to control the flow of fluid through a first fluid line 64" and a second fluid line 70". In this case, a solenoid control circuit can be manually activated by a rod 98 which trips a switch 99 in a box 100 as the motor control valve is activated by the lever 97. This action provides electricity to lines 85" and 86" enabling actuation of their respective solenoids.

While one type of motor control circuit B is illustrated in FIG. 1 of the present application, it should be appreciated that many other types of motor control circuits could also be provided for controlling a hydraulic motor which powers an earth maintenance device secured to a boom arm of a vehicle.

Similarly, many types of hydraulic breakaway circuits are conceivable for use in such an environment.

Figure 2:
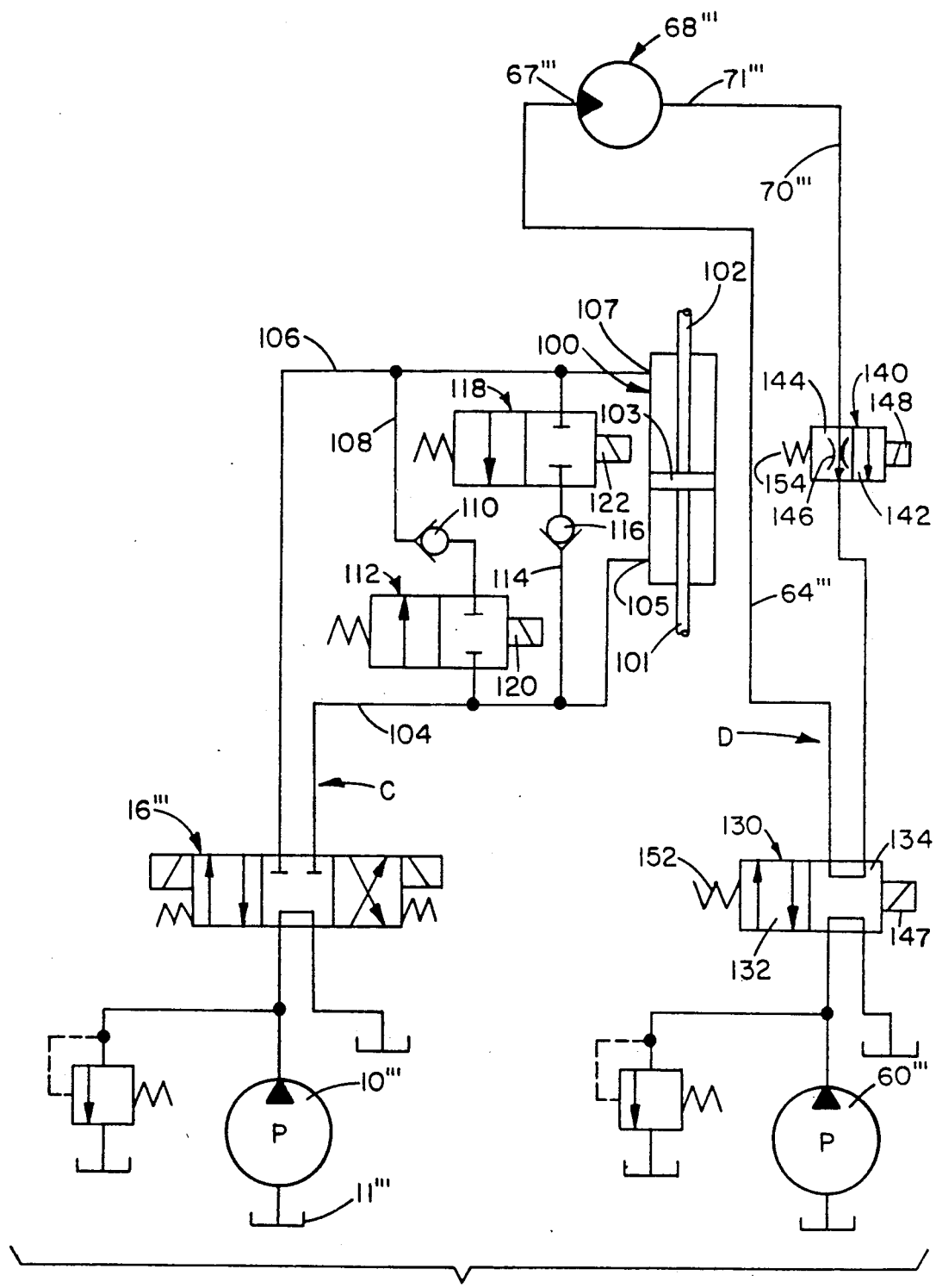
FIG. 2 is a hydraulic circuit diagram of a second type of hydraulic breakaway circuit together with a motor control circuit according to a second preferred embodiment of the present invention.

With reference now, therefore, to FIG. 2, another type of hydraulic breakaway circuit C and motor control circuit D is there illustrated. For better appreciation of this alternative, like components will be identified by like numerals with a triple primed ("') suffix and new components will be identified by new numerals.

In this type of breakaway circuit, a hydraulic cylinder 100 is provided with a pair of rods 101, 102 extending from opposing faces of a piston 103. In this type of cylinder, equivalent amounts of hydraulic fluid are held on each side of the piston. Therefore another type of hydraulic circuit is provided. In this circuit, a first fluid line 104 communicates with a lower end 105 of the cylinder 100 and a second fluid line 106 communicates with an upper end 107 of the cylinder. A hydraulic pump 10''' takes fluid from a sump 11''' and delivers it through fluid line 106 to the cylinder 100 as regulated by a control valve 16''' interposed in the line 106 between the pump 10''' and the cylinder 100. As with the embodiment of FIG. 1, the 10 valve 16''' is preferably a four position three way valve which is spring biased to a center, closed, position and is solenoid actuated to either end position.

A third fluid line 108 extends between the first and second lines 104, 106. Located in the third fluid line is a first check valve 110. Also located in the third fluid line 108 is a first shut off valve 112 that controls the flow of hydraulic fluid through the third line 108.

Further communicating the first and second fluid lines 104, 106 is a fourth fluid line 114. Located in the fourth fluid line is a second check valve 116. It should be appreciated that the two check valves are oppositely oriented so that hydraulic fluid can flow between the first and second fluid lines 104, 106 in either direction as allowed by the respective check valve. Located in the fourth fluid line 114 is a second shut off valve 118 which controls the flow of hydraulic fluid through the line.

As in the previous embodiment, solenoid actuators 120 and 122 are provided on a respective one of the first and second shut off valves 112, 118 to allow for their operation. The motor control circuit D comprises a pump 60''' which delivers hydraulic fluid through a fluid line 64''' to a hydraulically powered motor 68''' as regulated by a control valve 130. Hydraulic fluid flows through an outlet 71''' of the motor 68''' and into a second fluid line 70'''. Its flow through the second fluid line is regulated by a control valve 140 which includes a first envelope 142 that allows unrestricted flow through the line 70''' and a second envelope 144 which contains a restricted flow orifice 146 for restricting the rate of flow.

Preferably, the valve 130 includes a first envelope 132 which allows an unrestricted flow of fluid from the pump 60''' to the motor 68''' and a second envelope 134 which blocks such flow. It should also be recognized that the second envelope 134 does, however, allow a flow of fluid between the first fluid line 64''' and a second fluid line 70''' which connect, respectively, to an inlet 67''' and the outlet 71''' of a hydraulically powered motor 68'''.

Preferably, the valve 130 and the valve 140 are each actuated by a respective solenoid 147, 148 to their respective second envelopes 134, 144 and are suitably biased by a respective spring 152, 154 to their respective first envelopes 132, 142.

As in FIG. 1, when the motor control circuit valve 130 is solenoid actuated to its closed position, the solenoids 120 and 122 will be operated simultaneously therewith to close the shut off valves 112 and 118 as is illustrated. In this way, fluid flow is prevented between the two ends of the cylinder 100.

Figure 3:
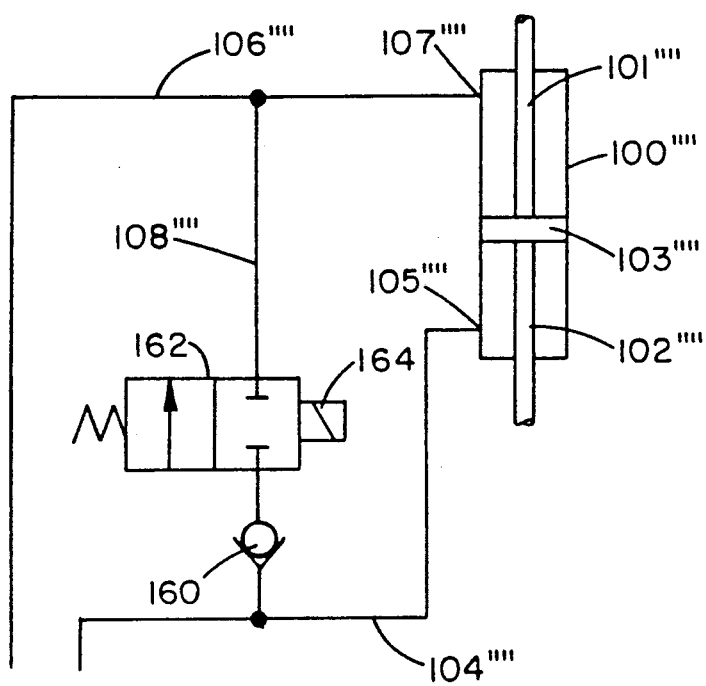
FIG. 3 is hydraulic circuit diagram of an second alternate embodiment of the second type of hydraulic breakaway circuit illustrated in FIG. 2 according to the present invention.

With reference now to FIG. 3, an alternate embodiment of the hydraulic breakaway circuit of FIG. 2 is there illustrated. For better appreciation of this alternative, like components will be identified by like numerals with a quadruple primed ("'') suffix and new components will be identified by new numerals.

In this breakaway circuit, a hydraulic cylinder 100'''' is provided with a pair of rods 101'''', 102'''' extending from opposing faces of a piston 103''''. A first fluid line 104'''' communicates with a lower end 105'''' of the cylinder 100'''' and a second fluid line 106'''' communicates with an upper end 107'''' of the cylinder. A suitable hydraulic pump (not illustrated in this embodiment) delivers hydraulic fluid through line 106'''' to the cylinder 100''''. A third fluid line 108'''' extends between the first and second fluid lines 104'''', 106''''. Located in the third fluid line is a check valve 160. Also located in the third fluid line 108'''' is a shut off valve 162 which controls the flow of hydraulic fluid through the check valve 160 and through the third fluid line 108''''. A solenoid actuator 164 is provided on the shut off valve 162 to allow 10 for its operation. It is noted that in this embodiment, the check valve 160 is located on the opposite side of the shut off valve 162 from the design shown in FIG. 2.

This type of hydraulic circuit would be used when only a one way breakaway is provided for the hydraulic cylinder 100''''. Accordingly, only a single shut off valve 162 is necessary to control the flow of hydraulic fluid through the third line 108''''. It should be noted in this embodiment that hydraulic fluid can only flow from the first line 104'''' to the second line 106'''' and not vice versa because of the check valve 160. Of course a check valve allowing flow only in the opposite direction could be substituted for check valve 160 if desired.

As in the previous embodiment, when a motor control circuit valve is solenoid actuated to its closed position, the solenoid 164 will be operated simultaneously therewith to close the shut off valve 162. In this way, fluid flow is then prevented between the cylinder ends 105'''' and 107''''.

Figure 4:
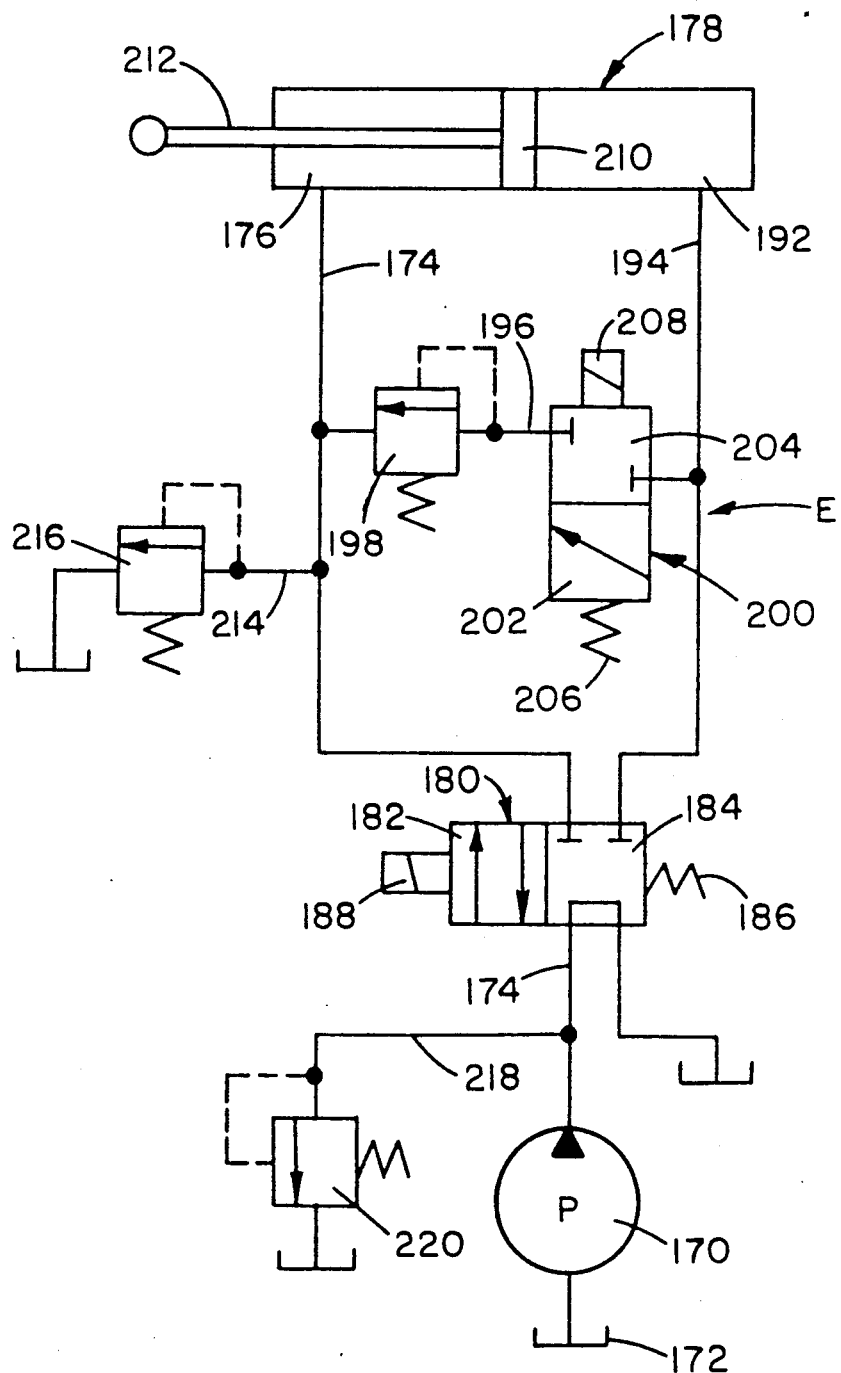
FIG. 4 is a hydraulic circuit diagram of a third type of hydraulic breakaway circuit and a control means according to a third preferred embodiment of the present invention.

Yet another hydraulic breakaway circuit E is illustrated in FIG. 4. In this circuit, a pump 170 draws hydraulic fluid from a sump 172 and sends pressurized hydraulic fluid through a first fluid line 174 to a left end 176 of a cylinder 178. Interposed between the cylinder 178 and the pump 170 in the line 174 is a control valve 180. This valve can be a two position four way valve as is illustrated. However, it should be appreciated that any other suitable type of valve could be provided as well. The valve 180 preferably includes a first envelope 182 which allows communication between the pump 170 and the cylinder 178 through line 174 and a second envelope 184 which blocks such communication. The valve is preferably biased by a spring 186 to the closed position or second envelope position and is actuated to the open or first envelope position by a solenoid 188.

Extending between a right end 192 of the cylinder 178 and the control valve 180 is a second fluid line 194. Connecting the first and second fluid lines 174 and 194 is a third fluid line 196. Located in the third fluid line 196 is a suitable relief valve 198. Also located in the third fluid line 196 is a shut off valve 200. This shut off valve is preferably a two position valve having a first envelope 202 which allows communication through line 196 and a second envelope 204 which blocks such communication. Preferably, the valve includes a spring member 206 which biases the valve 200 to its first envelope 202 and is solenoid actuated as at 208 into the closed position, or to the second envelope 204. As in the embodiment of FIG. when a suitable motor control valve (not illustrated) is solenoid actuated to an off position, the solenoid 208 of the shut off valve 200 also similarly actuates the shut off valve to a closed position in order to prevent the flow of hydraulic fluid through the third line 196.

In the embodiment illustrated in FIG. 4, the breakaway system is unidirectional and can be applied in the situation where, for example, only a one way breakaway is desired. Assuming that the cylinder 178 is locked in position and further assuming that a ground engaging assembly on the vehicle strikes a stationary object from such a direction that a cylinder piston 210 will be forced towards the right, pressurized fluid will be forced to flow out of the ram cylinder and into the line 194. Since such flow is cut off at the valve 180, pressurized fluid will then flow through the pressure relief valve 198 positioned in the line 196 that connects the first and second lines 174 and 194.

Upon flowing past the relief valve 198 the pressurized fluid then flows into line 174 and back to the other side of the cylinder. However, in this embodiment since the cylinder is a double acting cylinder with a single piston rod 212, not all of the fluid which flows through line 196 will be necessary to fill the volume on the other side of the piston since some of the volume is filled by the piston rod. Accordingly, provided in fluid communication with the first line 174 is a fourth fluid line 214 in which is positioned a pressure relief valve 216 that, when open, allows excess fluid to flow back into a sump.

It should also be noted that located downstream from the motor control valve 180 in FIG. 4 is a fifth fluid line 218 in which is positioned a third relief valve 220 that allows excess hydraulic fluid to flow into a sump, such as the sump 172. A similar construction is illustrated in FIG. 1 in which such a relief valve is located upstream from the motor control valve 66 in order to vent excess hydraulic pressure.

Figure 5:
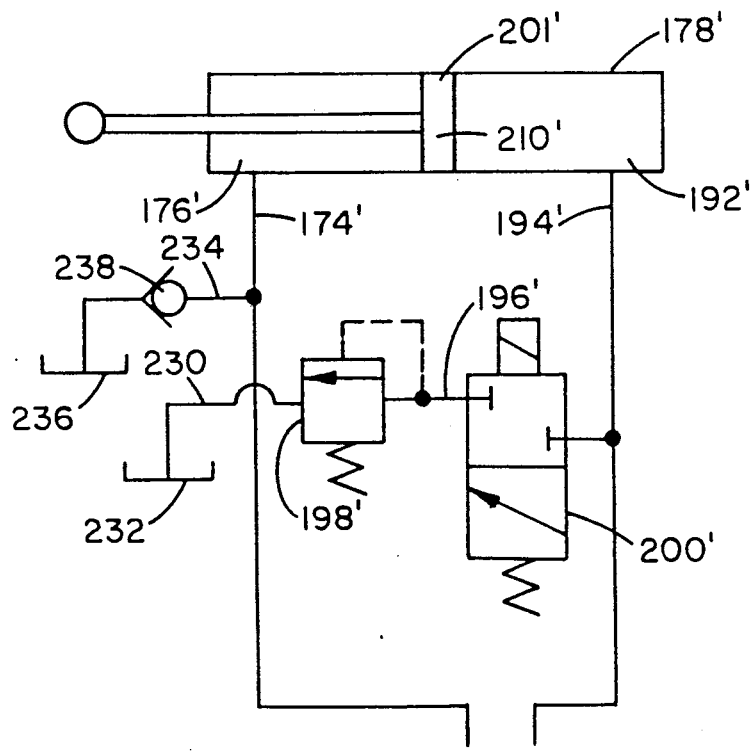
FIG. 5 is a first alternate embodiment of the third hydraulic circuit diagram of FIG. 4.

With reference now to FIG. 5, a first alternate embodiment of the hydraulic breakaway circuit of FIG. 4 is there illustrated. For better appreciation of this alternative, like components will be identified by like numerals with a primed suffix (') and new components will be identified by new numerals.

In this circuit, first and second fluid lines 174' and 194' are connected, respectively, to left and right ends 176' and 192' of a cylinder 178'. Extending between the first and second fluid lines 174' and 194' is a third fluid line 196'. Located in the third fluid line 196' are a suitable relief valve 198' and a shut off valve 200'. The shut off valve 200' is identical to the shut off valve 200 illustrated in FIG. 4 and functions in the same manner.

In the embodiment of FIG. 5, however, upon flowing past the relief valve 198', the pressurized fluid flows into a line 230 which leads to a sump 232. That sump can be the same as a suitable sump from which a pump, as in FIG. 4, draws hydraulic fluid. In order to allow fluid to flow to the space behind the piston 210, a fourth fluid line 234 is provided in communication with the first fluid line 174. The fourth fluid line leads fluid from a sump 236 which may be the same as sump 232. Interposed in the fluid line 234 is a check valve 238 which allows only flow from the sump to the line 174' and not a reverse flow. With this embodiment, hydraulic fluid flowing through 196' will eventually flow to sump 232 rather than flowing back to the other side of the cylinder 178'. Therefore, additional fluid needed in the cylinder as the piston 210' therein moves is provided through line 234 as regulated by check valve 238.

Figure 6:
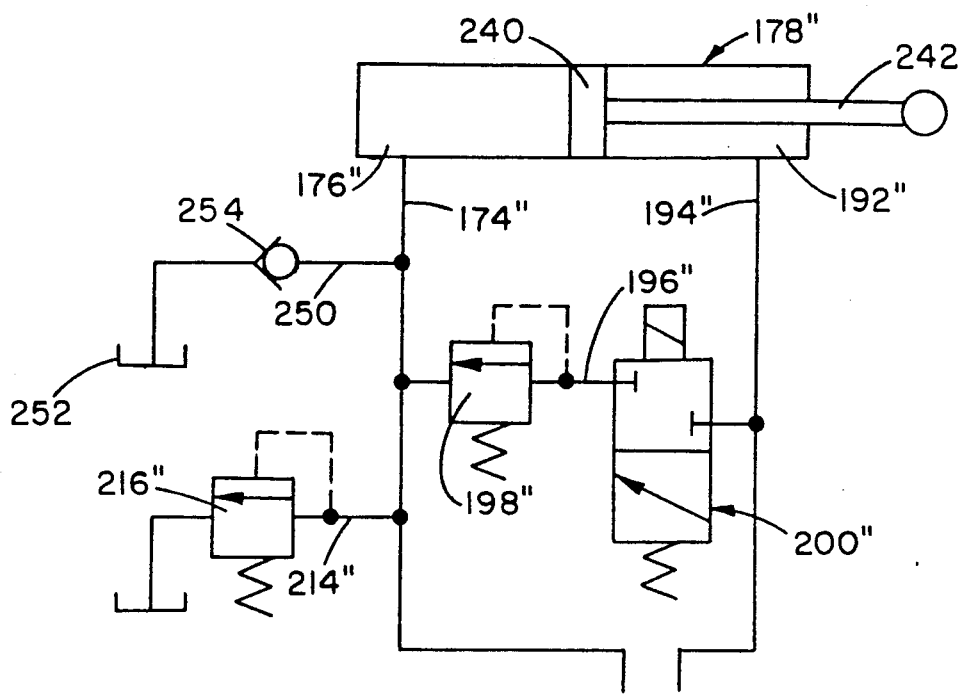
FIG. 6 is a second alternate embodiment of the hydraulic circuit diagram of FIG. 4.

Another hydraulic breakaway circuit is illustrated in FIG. 6. For better appreciation of this alternative, like components will be identified by like numerals with a double primed suffix (") and new components will be identified by new numerals.

In this type of breakaway circuit, a hydraulic cylinder 178" is provided with a piston 240 from which extends a piston rod 242. The cylinder 178" has a left end 176" and a right end 192" and the rod 242 extends to the right end 192" of the cylinder. Leading to the left end 176" of the cylinder is a first fluid line 174" and leading from the right end 192" of the cylinder is a second fluid line 194". Connecting the first and second fluid lines 174", 194" is a third fluid line 196". Positioned in the third fluid line 196" is a relief valve 198" and a control valve 200". These function in the same fashion as in the embodiment illustrated in FIG. 4.

Upon flowing past the relief valve 198", the pressurized fluid then flows into line 174', and back to the other side of the cylinder. Also provided in this embodiment of the system is a fourth fluid line 214" in which is positioned a relief valve 216" which allows excess fluid to flow back into a sump. In this embodiment, since the cylinder is a double acting cylinder with a single piston rod 242, more fluid than that which flows through the line 196" will be necessary to fill the volume on the other side of the piston since none of that volume is filled by the piston rod. Therefore, positioned in fluid communication with the first fluid line 174" is a fifth fluid line 250. The fifth fluid line communicates a sump 252 with the first fluid line 174". Located in the fifth fluid line 250 is a check valve 254 which restricts fluid flow to one direction, i.e. from the sump 252 to the first fluid line 174" but not in the reverse direction. In this way, any additional fluid which needs to flow to the left side of the piston 240 is allowed to flow through the fifth fluid line 250 and to the left end 176" of the cylinder 178".

Figure 7A:
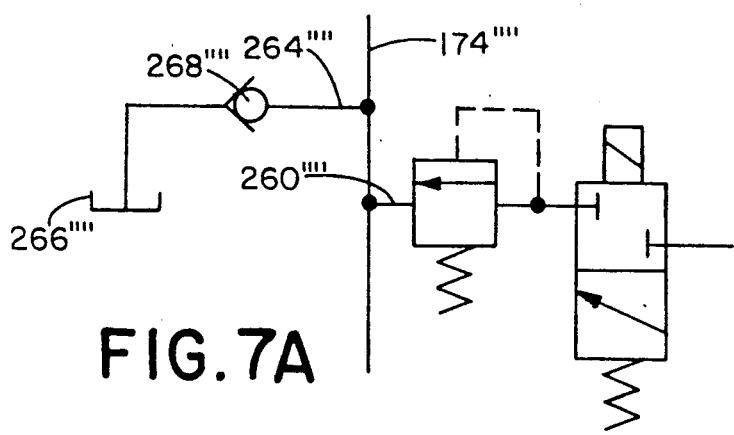
FIG. 7 is a third alternate embodiment of the hydraulic circuit diagram of FIG. 4; and, FIG. 7A is an alternate embodiment of a portion of the hydraulic circuit of FIG. 7.
Figure 7:
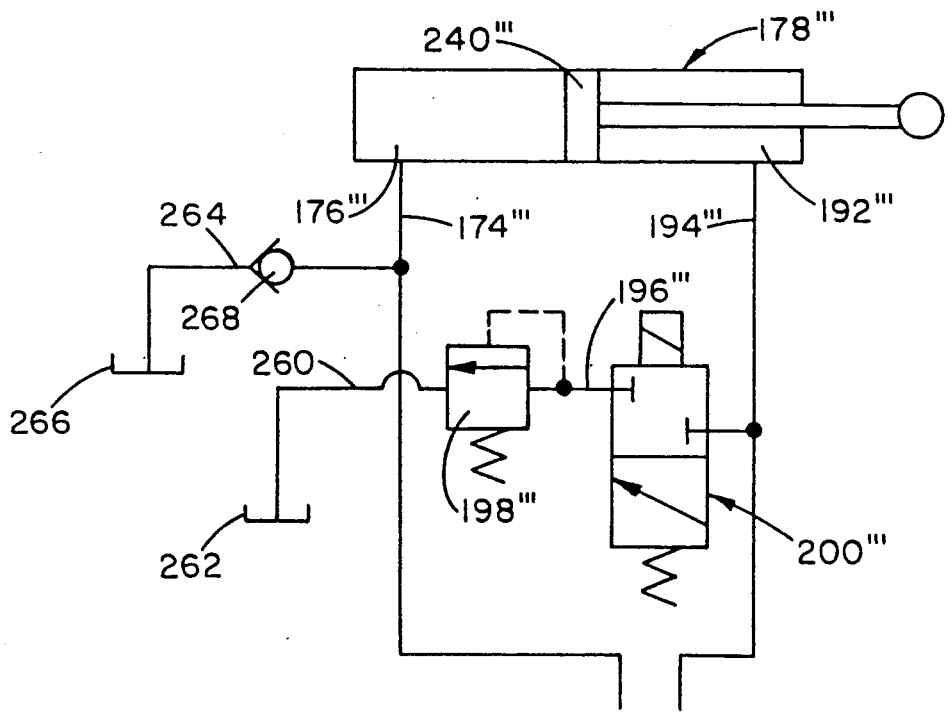

With reference now to the embodiment of FIG. 7, another type of hydraulic breakaway circuit is there illustrated. For better appreciation of this alternative, like components will be identified by like numerals with a triple primed suffix ('") and new components will be identified by new numerals.

In this type of breakaway circuit, a hydraulic cylinder 178'" includes a left end 176'" and a right end 192'". The left end cylinder 176'" communicates with a first hydraulic fluid line 174'" whereas the right end 192'" communicates with a second fluid line 194'". Connecting the first and second hydraulic fluid lines 174'", 194'" is a third fluid line 196'". Located in the third fluid line 196'" is a relief valve 198'" as well as a control valve 200'''. These function in the same fashion as described in relation to the embodiment of FIG. 4.

Located downstream from the relief valve 198''' is a fourth fluid line 260 which leads to a sump 262. In this way, all hydraulic fluid which flows through the relief valve 198''' will flow to the sump 262 through the fourth fluid line 260. Since all of the fluid flowing out of the cylinder 178''' as a piston 240''' thereof moves towards the right end 192''' flows into the sump 262, hydraulic replacement fluid is needed for the left end of the cylinder 178''' behind the piston 240'''. To this end, a fifth hydraulic fluid line 264 is in fluid communication with the first fluid line 174'''. The fifth hydraulic fluid line allows hydraulic fluid to flow from a sump 266 which may be the same as the sump 262, to the cylinder 178'''. Located in the fifth fluid line 264 is a check valve 268 which prevents a flow of hydraulic fluid from the line 174''' to sump 266 and only allows a flow of fluid from the sump the line. In this way, whatever replacement fluid is needed as the piston 240''' moves to the right, as provided from the sump 266 through the line 264 as allowed by the check valve 268 and into the first hydraulic fluid line 174''' and then into the cylinder 178'''.

With reference now to the embodiment of FIG. 7A, another version is shown of the embodiment of FIG. 7. For better appreciation of this alternative, like components will be identified by like numerals with a quadruple primed suffix ('''') and new components will be identified by new numerals.

In this embodiment, a line 260'''' terminates at a first line 174'''' instead of going to sump as in the embodiment of FIG. 7. In order to provide additional hydraulic fluid needed for the hydraulic piston cylinder combination illustrated in FIG. 7, a fifth hydraulic fluid line 264'''' is in fluid communication with the first hydraulic fluid line 174'''' as in FIG. 7.

Since the left hand side of the cylinder illustrated in FIG. 7 will require more hydraulic fluid than will flow through the line 260, it does not matter that a sump is not provided in fluid communication with the line 260''''. A check valve 268'''' in the line 264'''' allows flow from a sump 266'''' to the line 174'''', but not vice versa.

In all of the embodiments of FIGS. 5, 6, 7 and 7A, a motor control circuit such as is illustrated in FIG. 1 is provided.

The invention has been described with reference to preferred and alternate embodiments. Obviously, modifications and alterations will occur to others upon the reading and understanding of the preceding specification. It is intended that the invention be construed as including all such alterations and modifications insofar as they come within the scope of the appended claims or the equivalents thereof.

Having thus described the preferred embodiments, the invention is claimed as follows:

1. A hydraulic control system comprising:
a pump for pressurizing a hydraulic fluid;
a hydraulic cylinder having a piston mounted for reciprocation therein;
a cylinder hydraulic circuit interconnecting said pump and said cylinder so as to allow a movement of said piston in said cylinder when pressurized fluid is transmitted from said pump, said circuit comprising:
a first hydraulic fluid line extending between said pump and a first end of said cylinder,
a control valve located in said first fluid line for controlling the communication of fluid between said pump and said cylinder first end,
a second hydraulic fluid line in fluid communication with said first fluid line at a location between said control valve and said cylinder,
a first relief valve located in said second fluid line, and
a first shut off valve located in said second fluid line and interposed between said first relief valve and said first fluid line, said shut off valve being solenoid actuated to a closed position;
a motor hydraulic circuit comprising:
a third hydraulic fluid line,
a motor control valve for controlling a flow of fluid through said third hydraulic fluid line; and,
an interconnect means for operating said first shut off valve and said motor control valve in unison in order to simultaneously prevent the flow of fluid through said second and third fluid lines.

2. The system of claim 1 wherein said cylinder hydraulic circuit further comprises:
a fourth hydraulic fluid line extending between said control valve and a second end of said hydraulic cylinder;
a second relief valve in fluid communication with said fourth fluid line downstream from said control valve; and,
a second shut off valve interposed between said second relief valve and said fourth hydraulic fluid line, said second shut off valve being solenoid actuated, and wherein said interconnect means operates said second shut off valve in unison with said first control valve and said motor control valve.

3. The system of claim wherein said motor hydraulic circuit further comprises:
a fifth hydraulic fluid line extending from said motor control valve in a direction substantially parallel to said third fluid line; and,
a relief valve interconnecting said third hydraulic fluid line and said fifth hydraulic fluid line downstream from said motor control valve.

4. The system of claim 3 further comprising:
a pump having an inlet end to which one end of said third hydraulic fluid line is connected and an outlet end to which one end of said fifth hydraulic fluid line is connected; and,
a motor, wherein said motor hydraulic circuit is interposed between said motor and said pump such that said motor control valve is located adjacent said pump and said relief valve is located adjacent said motor.

5. The system of claim 3 wherein said cylinder hydraulic circuit further comprises:
a first one way valve interposed between said first hydraulic line and a first sump; and,
a second one way valve interposed between said third hydraulic line and a second sump.

6. The system of claim 2 further comprising a sixth hydraulic fluid line extending from said control valve to a sump and wherein said control valve is a four position three way valve, which is spring biased to a center position and solenoid actuated to either end position.

7. The system of claim 1 wherein said motor control valve a solenoid actuated spring biased valve.

8. The system of claim 1 wherein said motor control valve is a manually actuated valve.

9. The system of claim 1 wherein said interconnect means comprises:
a switch; and,
electric wires which extend from a respective one of said solenoid actuated valves to said switch.

10. The system of claim 8 wherein said interconnect means comprises:
a rod secured at one end of said motor control valve; and,
a switch mounted on a box in which wires for said first shut-off valve extend, wherein said rod cooperates with said switch to selectively provide electricity to a solenoid of said first shut-off valve.

11. A hydraulic control system comprising:
a pump;
a hydraulic cylinder;
a cylinder hydraulic circuit interconnecting said pump and said cylinder, said circuit comprising:
a first hydraulic fluid line extending between said pump and a first end of said cylinder,
a control valve located in said fluid line for controlling the communication of fluid between said pump and said cylinder first end,
a second hydraulic fluid line interconnecting said control valve and a second end of said cylinder,
a third hydraulic fluid line interconnecting said first and second hydraulic lines,
a check valve located in said third fluid line, and
a first shutoff valve located in said third fluid line for controlling a flow of fluid through said third fluid line;
a motor hydraulic circuit comprising:
a fourth hydraulic fluid line,
a motor control valve for controlling the flow of fluid through said fourth fluid line; and,
an interconnect means for operating said first shut off valve and said motor control valve in unison in order to simultaneously prevent the flow of fluid through said third and fourth fluid lines.

12. The system of claim 11 further comprising:
a fifth hydraulic fluid line interconnecting said first and second hydraulic fluid lines; and,
a second check valve located in said fifth fluid line.

13. The system of claim 12 further comprising a second shutoff valve located in said fifth fluid line, wherein said second shutoff valve is solenoid actuated and said interconnect means operates said second shutoff valve simultaneously with said first shutoff valve and said motor control valve.

14. The system of claim 13 wherein said first shut off valve and said motor control valve are both solenoid actuated to a closed position and wherein said interconnect means comprises:
an electric control switch; and,
an electrical lead extending from each of said first and second shutoff valves and said motor control valve to said switch.

15. A hydraulic control system comprising:
a pump;
a hydraulic cylinder;
a cylinder hydraulic circuit interconnecting said pump and said cylinder, said circuit comprising:
a first hydraulic fluid line extending between said pump and a first end of said cylinder,
a control valve located in said fluid line for controlling a flow of fluid between said pump and said cylinder first end,
a second hydraulic fluid line extending between said control valve and a second end of said cylinder,
a third hydraulic fluid line communicating with at least one of said first and second hydraulic fluid lines;
a first valve located in said third fluid line for controlling a flow of fluid through said third line, and
a first shut off valve located in said third fluid line for controlling a flow of fluid through said third hydraulic fluid line;
a motor hydraulic circuit comprising:
a fourth hydraulic fluid line,
a motor control valve for controlling a flow of fluid through said fourth hydraulic fluid line; and,
an interconnect circuit for interconnecting said first shut off valve and said motor control valve so that they are operated to a closed position in unison in order to simultaneously prevent the flow of fluid through said third and fourth fluid lines.

16. The system of claim 15 wherein said first shut off valve and said motor control valve are both solenoid actuated and wherein said interconnect means comprises electric wires which extend from a respective one of said solenoid actuated valves to a switch.

17. The system of claim 15 further comprising:
a fifth hydraulic fluid line communicating with another one of said first and second fluid lines;
a second valve located in said fifth fluid line for controlling a flow of fluid through said fifth fluid line; and,
a second shut off valve located in said fifth fluid line for controlling a flow of fluid through said fifth fluid line, said second shut off valve being solenoid actuated to a closed position, wherein said interconnect circuit interconnects said first and second shut off valves with said motor control valve so that they are operated to a closed position in unison in order to simultaneously prevent the flow of fluid through said third, fourth and fifth fluid lines.

18. A method for simultaneously controlling a hydraulic breakaway circuit and a hydraulic motor circuit comprising:
providing a hydraulically actuated cylinder, a pump, a hydraulic circuit interconnecting the cylinder with the pump, and a control valve which controls the communication of fluid between the pump and the cylinder and thus a movement of a piston in the cylinder;
providing a hydraulic motor, a pump, and a motor control circuit in which a control valve is utilized for selectively allowing the flow of pressurized hydraulic fluid from the pump to the hydraulic motor;
blocking a flow of fluid from the cylinder pump to the cylinder;
subsequently blocking a flow of fluid from the motor pump to the motor; and,
simultaneously blocking a flow of fluid out of either end of the cylinder.

19. The method of claim 18 wherein the hydraulic cylinder circuit includes two relief valves located, respectively, in a first and a second hydraulic fluid line each communicating on a first end with one of a pair of fluid lines extending, respectively, from each end of the hydraulic cylinder, said first and second hydraulic fluid lines each communicating on a second end with a sump, and wherein said step of blocking a flow of fluid from the hydraulic cylinder includes the subsidiary steps of blocking a flow of fluid through either of the two relief valves.

20. The method of claim 18 wherein the hydraulic cylinder circuit includes at least one fluid line which extends between a pair of hydraulic fluid lines communicating with a respective one of the two ends of the hydraulic cylinder and wherein said step of preventing a flow of fluid from either end of the hydraulic circuit includes the subsidiary step of blocking a flow of fluid through said at least one fluid line.

* * * * *

UNITED STATES PATENT AND TRADEMARK OFFICE
CERTIFICATE OF CORRECTION

| | | |
|---|---|---|
| PATENT NO. | : 5,046,311 | Page 1 of 1 |
| APPLICATION NO. | : 07/450414 | |
| DATED | : September 10, 1991 | |
| INVENTOR(S) | : Jack O. Cartner | |

It is certified that error appears in the above-identified patent and that said Letters Patent is hereby corrected as shown below:

Column 12:
In claim 3, line 1, after "claim", insert --1--.

Signed and Sealed this

Seventeenth Day of July, 2007

JON W. DUDAS
*Director of the United States Patent and Trademark Office*